(12) United States Patent
Nakano

(10) Patent No.: US 11,830,223 B2
(45) Date of Patent: *Nov. 28, 2023

(54) CAMERA CALIBRATION APPARATUS, CAMERA CALIBRATION METHOD, AND NONTRANSITORY COMPUTER READABLE MEDIUM STORING PROGRAM

(71) Applicant: NEC Corporation, Tokyo (JP)

(72) Inventor: Gaku Nakano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 145 days.

This patent is subject to a terminal disclaimer.

(21) Appl. No.: 17/600,716

(22) PCT Filed: Apr. 8, 2019

(86) PCT No.: PCT/JP2019/015330
§ 371 (c)(1),
(2) Date: Oct. 1, 2021

(87) PCT Pub. No.: WO2020/208686
PCT Pub. Date: Oct. 15, 2020

(65) Prior Publication Data
US 2022/0180563 A1 Jun. 9, 2022

(51) Int. Cl.
*G06T 7/80* (2017.01)
*G06T 7/50* (2017.01)
(Continued)

(52) U.S. Cl.
CPC ............... *G06T 7/80* (2017.01); *G06T 7/50* (2017.01); *G06T 7/70* (2017.01); *H04N 17/004* (2013.01); *G06T 2207/30244* (2013.01)

(58) Field of Classification Search
CPC ..... G06T 7/50; G06T 7/70; G06T 7/80; G06T 2207/30244
See application file for complete search history.

(56) References Cited

U.S. PATENT DOCUMENTS 9,284,461 B2 * 3/2016 Nakamura ........... C09D 11/101
9,875,542 B2 * 1/2018 Ikeda .................. G06T 7/80
(Continued)

FOREIGN PATENT DOCUMENTS

JP 2005-352630 A 12/2005
JP 2007-256091 A 10/2007
(Continued)

OTHER PUBLICATIONS

U.S. Notice of Allowance for U.S. Appl. No. 17/687,990 dated Jun. 15, 2022.
(Continued)

*Primary Examiner* — Brian P Yenke

(57) ABSTRACT

In a camera calibration apparatus (10), an acquisition unit (11) acquires a first normal vector in an image plane and a second normal vector in the image plane respectively corresponding to a first normal vector in a world coordinate space and a second normal vector in the world coordinate space which are normal vectors with respect to a reference plane in the world coordinate space and have the same length. A projective depth calculation unit (12) calculates a projective depth vector having, as vector elements, four projective depths respectively corresponding to a start point and an end point of the first normal vector in the image plane and a start point and a end point of the second normal vector in the image plane.

15 Claims, 9 Drawing Sheets

(51) Int. Cl.
   *G06T 7/70*    (2017.01)
   *H04N 17/00*   (2006.01)

(56) References Cited

U.S. PATENT DOCUMENTS

| | | | |
|---|---|---|---|
| 10,088,294 B2* | 10/2018 | Moteki | G01B 11/002 |
| 10,126,115 B2 | 11/2018 | Nakano | |
| 10,552,983 B1* | 2/2020 | Slobodyanyuk | G06T 7/80 |
| 10,602,126 B2* | 3/2020 | Rowell | H04N 9/8715 |
| 10,666,934 B1 | 5/2020 | Wang et al. | |
| 10,713,810 B2* | 7/2020 | Furihata | G06T 7/70 |
| 10,719,956 B2 | 7/2020 | Nakano | |
| 10,922,844 B2* | 2/2021 | Chang | G06T 7/70 |
| 11,257,272 B2 | 2/2022 | Rowell et al. | |
| 11,521,333 B2* | 12/2022 | Nakano | G06T 7/80 |
| 2002/0186897 A1 | 12/2002 | Kim et al. | |
| 2012/0120199 A1* | 5/2012 | Ben Himane | G06T 7/75 |
| | | | 348/46 |
| 2014/0355820 A1* | 12/2014 | Wu | G06T 7/75 |
| | | | 382/103 |
| 2015/0029345 A1 | 1/2015 | Ikeda | |
| 2016/0239952 A1 | 8/2016 | Tanaka | |
| 2017/0243374 A1* | 8/2017 | Matsuzawa | G06T 7/80 |
| 2018/0186004 A1* | 7/2018 | Park | G06T 7/70 |
| 2018/0356213 A1* | 12/2018 | Zheng | G06T 5/006 |
| 2020/0034987 A1* | 1/2020 | Meng | G06T 5/006 |
| 2020/0342596 A1 | 10/2020 | Yangdai | |
| 2022/0067973 A1* | 3/2022 | Lee | G06V 20/56 |
| 2022/0084246 A1* | 3/2022 | Dai | G06T 3/60 |
| 2022/0132092 A1 | 4/2022 | Shibata et al. | |
| 2022/0138971 A1* | 5/2022 | Matsunobu | G06T 7/292 |
| | | | 382/103 |
| 2022/0156977 A1 | 5/2022 | Nakano et al. | |
| 2022/0180560 A1* | 6/2022 | Nakano | G06T 3/40 |
| 2022/0262037 A1* | 8/2022 | Nakano | G06T 3/20 |
| 2022/0366604 A1* | 11/2022 | Park | G06T 7/248 |
| 2023/0080638 A1* | 3/2023 | Guizilini | G06T 7/80 |

FOREIGN PATENT DOCUMENTS

| | | |
|---|---|---|
| JP | 2010-181919 A | 8/2010 |
| JP | 6011548 B2 | 10/2016 |
| WO | 2013/111229 A1 | 8/2013 |
| WO | 2015/045834 A1 | 4/2015 |

OTHER PUBLICATIONS

International Search Report for PCT Application No. PCT/JP2019/015330, dated Jul. 9, 2019.

* cited by examiner

CAMERA CALIBRATION APPARATUS, CAMERA CALIBRATION METHOD, AND NONTRANSITORY COMPUTER READABLE MEDIUM STORING PROGRAM

This application is a National Stage Entry of PCT/JP2019/015330 filed on Apr. 8, 2019, the contents of all of which are incorporated herein by reference, in their entirety.

TECHNICAL FIELD

The present disclosure relates to a camera calibration apparatus, a camera calibration method, and a non-transitory computer readable medium storing a program.

BACKGROUND ART

In order to perform a three-dimensional image analysis using a multi-viewpoint camera system composed of a plurality of cameras, it is necessary to clarify optical characteristics of the cameras and the positional relationship between the cameras. The optical characteristics are parameters unique to each camera, for example, a focal length, lens distortion, optical center coordinates, etc., and are collectively referred to as "internal parameters". The internal parameters are invariant unless a zoom value is changed or a lens of the camera is replaced with a different lens. The parameters representing the positional relationship between the cameras refer to a rotation matrix and a translation vector and are referred to as "external parameters". The external parameters are invariant as long as the camera is not moved relative to an origin of three-dimensional coordinates. If these internal and external parameters are known, size and length of a subject in an image can be converted into a physical distance (e.g., meters), and a three-dimensional shape of the subject can be restored. Calculating one or both of these internal and external parameters is referred to as "camera calibration". Also, one of the internal parameters and the external parameters may be simply referred to as "camera parameters" or both of them may be simply referred to as "camera parameters" without distinguishing between the internal parameters and the external parameters.

Various methods of calculating the camera parameters have been proposed. For example, a method using a flat calibration board devised by Z. Zhang is widely known as a method for calculating the internal parameters of a monocular camera. In addition, Patent Literature 1 proposes a method of performing camera calibration using a plane calibration object having known three-dimensional coordinates, such as the method of Zhang.

In addition, Patent Literature 2 proposes a method of detecting a line segment vertical to a horizontal plane from an image, projecting a plurality of the detected vertical lines onto a virtual plane, and calculating a rotation matrix (i.e., the internal parameters) using an evaluation function for minimizing parallelism of each line segment on the virtual plane.

CITATION LIST

Patent Literature

Patent Literature 1: International Patent Publication No. WO2015/045834
Patent Literature 2: Japanese Patent No. 6011548

SUMMARY OF INVENTION

Technical Problem

However, in the method of Zhang and the method disclosed in Patent Literature 1, the three-dimensional coordinates are defined as points distributed on a plane, and the three-dimensional coordinates of each point are acquired by image processing to calculate the external parameters. In order to perform camera calibration with high accuracy, it is widely known that, desirably, the three-dimensional coordinates are observed uniformly over an entire screen without corresponding points being unevenly located, such as only in the center or a part of the screen. However, in order to calibrate a camera that observes a wide area of an environment, a large planar calibration object is required. For this reason, the calibration may be virtually impossible or, even if it is possible, not convenient.

Since the method disclosed in Patent Literature 2 assumes that the internal parameters are known, it is necessary to use the method of Zhang or the like in advance. Therefore, as described above, there is a possibility that calibration may be practically impossible or even if it is possible, not convenient.

An object of the present disclosure is to provide a camera calibration apparatus, a camera calibration method, and a non-transitory computer readable medium storing a program which can calculate an internal parameter and an external parameter by a simpler method.

Solution to Problem

A first example aspect is a camera calibration apparatus including:
an acquisition unit configured to acquire, in an image plane of an image obtained by photographing a world coordinate space using a camera, a first normal vector in the image plane and a second normal vector in the image plane respectively corresponding to a first normal vector in the world coordinate space and a second normal vector in the world coordinate space which are normal vectors with respect to a reference plane in the world coordinate space and have the same length;
a projective depth calculation unit configured to calculate a projective depth vector having, as vector elements, four projective depths respectively corresponding to a first start point and a first end point of the first normal vector in the image plane and a second start point and a second end point of the second normal vector in the image plane; and
a camera parameter calculation unit configured to calculate an internal parameter and an external parameter of the camera based on the calculated projective depth vector, a first start point vector in the image plane and a first end point vector in the image plane respectively corresponding to the first start point and the first end point, and a second start point vector in the image plane and a second end point vector in the image plane respectively corresponding to the second start point and the second end point.

A second example aspect is a camera calibration method including: acquiring, in an image plane of an image obtained by photographing a world coordinate space using a camera, a first normal vector in the image plane and a second normal vector in the image plane respectively corresponding to a first normal vector in the world coordinate space and a second normal vector in the world coordinate space which are normal vectors with respect to a reference plane in the world coordinate space and have the same length;

calculating a projective depth vector having, as vector elements, four projective depths respectively corresponding to a first start point and a first end point of the first normal vector in the image plane and a second start point and a second end point of the second normal vector in the image plane; and calculating an internal parameter and an external parameter of the camera based on the calculated projective depth vector, a first start point vector in the image plane and a first end point vector in the image plane respectively corresponding to the first start point and the first end point, and a second start point vector in the image plane and a second end point vector in the image plane respectively corresponding to the second start point and the second end point.

A third example aspect is a non-transitory computer readable medium storing a program for causing a computer to execute processing of:

acquiring, in an image plane of an image obtained by photographing a world coordinate space using a camera, a first normal vector in the image plane and a second normal vector in the image plane respectively corresponding to a first normal vector in the world coordinate space and a second normal vector in the world coordinate space which are normal vectors with respect to a reference plane in the world coordinate space and have the same length;

calculating a projective depth vector having, as vector elements, four projective depths respectively corresponding to a first start point and a first end point of the first normal vector in the image plane and a second start point and a second end point of the second normal vector in the image plane; and calculating an internal parameter and an external parameter of the camera based on the calculated projective depth vector, a first start point vector in the image plane and a first end point vector in the image plane respectively corresponding to the first start point and the first end point, and a second start point vector in the image plane and a second end point vector in the image plane respectively corresponding to the second start point and the second end point.

Advantageous Effects of Invention

According to the present disclosure, it is possible to provide a camera calibration apparatus, a camera calibration method, and a non-transitory computer readable medium storing a program which can accurately calculate an internal parameter and an external parameter by a simpler method.

DESCRIPTION OF EMBODIMENTS

Example embodiments will be described below with reference to the drawings. In the example embodiments, the same or equivalent elements are denoted by the same reference signs, and repeated description is omitted.

First Example Embodiment

Figure 1:
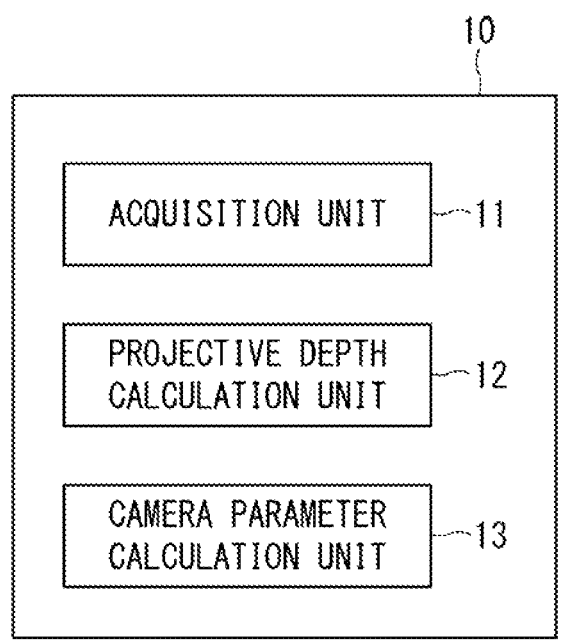
FIG. 1 is a block diagram showing an example of a camera calibration apparatus according to a first example embodiment.

FIG. 1 is a block diagram showing an example of a camera calibration apparatus according to a first example embodiment. In FIG. 1, a camera calibration apparatus 10 includes an acquisition unit 11, a projective depth calculation unit 12, and a camera parameter calculation unit 13.

The acquisition unit 11 acquires a plurality of "normal vectors in an image plane" in the "image plane" of an image obtained by photographing the "world coordinate space" by a camera (not shown). The plurality of "normal vectors in the image plane" respectively correspond to a plurality of "normal vectors in a world coordinate space" with respect to a "reference plane" in the "world coordinate space". The "world coordinate space" is a space defined by a world coordinate system. The "reference plane" may be, for example, a horizontal plane such as the ground or floor. The "normal vector in the world coordinate space" may be, for example, a side such as a building or a shelf extending perpendicularly to the above horizontal plane.

Here, the plurality of "normal vectors in the image plane" acquired by the acquisition unit 11 include two normal vectors in the image plane respectively corresponding to two normal vectors in the world coordinate space having the same length. Hereinafter, the two normal vectors in the world coordinate space having the same length may be referred to as a "first normal vector in the world coordinate space" and a "second normal vector in the world coordinate space", respectively. The two normal vectors in the image plane corresponding to the "first normal vector in the world coordinate space" and the "second normal vector in the world coordinate space" are sometimes referred to as a "first normal vector in the image plane" and a "second normal vector in the image plane", respectively.

The projective depth calculation unit 12 calculates a "projective depth vector" having, as vector elements, four "projective depths" corresponding to a start point and an end point of the first normal vector in the image plane and a start point and an end point of the second normal vector in the image plane, respectively. Hereinafter, the start point and the end point of the first normal vector in the image plane may be referred to as a "first start point" and a "first end point", respectively. The start point and the end point of the second normal vector in the image plane may be referred to as a "second start point" and a "second end point", respectively.

That is, the projective depth calculation unit 12 calculates the projective depth with respect to the three-dimensional coordinates of the first start point from the camera. Similarly, the projective depth is calculated for the first end point, the second start point, and the second end point. That is, the "projective depth" means a depth up to the three-dimensional coordinates viewed from the camera in a projection space.

For example, the projective depth calculation unit 12 calculates the projective depth vector based on a relation that the projective depth vector is a "zero space" of a "first matrix" having a first start point vector in the image plane, a first end point vector in the image plane, a second start point vector in the image plane, and a second end point vector in the image plane as matrix elements.

The camera parameter calculation unit 13 calculates an internal parameter and an external parameter of the camera. The calculation is performed based on the projective depth vector calculated by the projective depth calculation unit 12, and the "first start point vector in the image plane", the "first end point vector in the image plane", the "second start point vector in the image plane", and the "second end point vector in the image plane". The "first start point vector in the image plane" and the "first end point vector in the image plane" correspond to the first start point and the first end point, respectively, and the "second start point vector in the image plane" and the "second end point vector in the image plane" correspond to the second start point and the second end point, respectively.

As described above, according to the first example embodiment, in the camera calibration apparatus 10, the acquisition unit 11 acquires the first normal vector in the image plane and the second normal vector in the image plane, which respectively correspond to the first normal vector in the world coordinate space and the second normal vector in the world coordinate space, which are normal vectors with respect to the reference plane in the world coordinate space and have the same length. The projective depth calculation unit 12 calculates the projective depth vector having, as vector elements, the four projective depths respectively corresponding to the start point and the end point of the first normal vector in the image plane and the start point and the end point of the second normal vector in the image plane.

With such a configuration of the camera calibration apparatus 10, the projective depth vector can be calculated, and thus the internal parameter and the external parameter can be calculated without using a calibration board. That is, the internal parameter and external parameter can be calculated by a simpler method.

Second Example Embodiment

A second example embodiment relates to a more specific example embodiment.

<Overview of Camera System>

Figure 2:
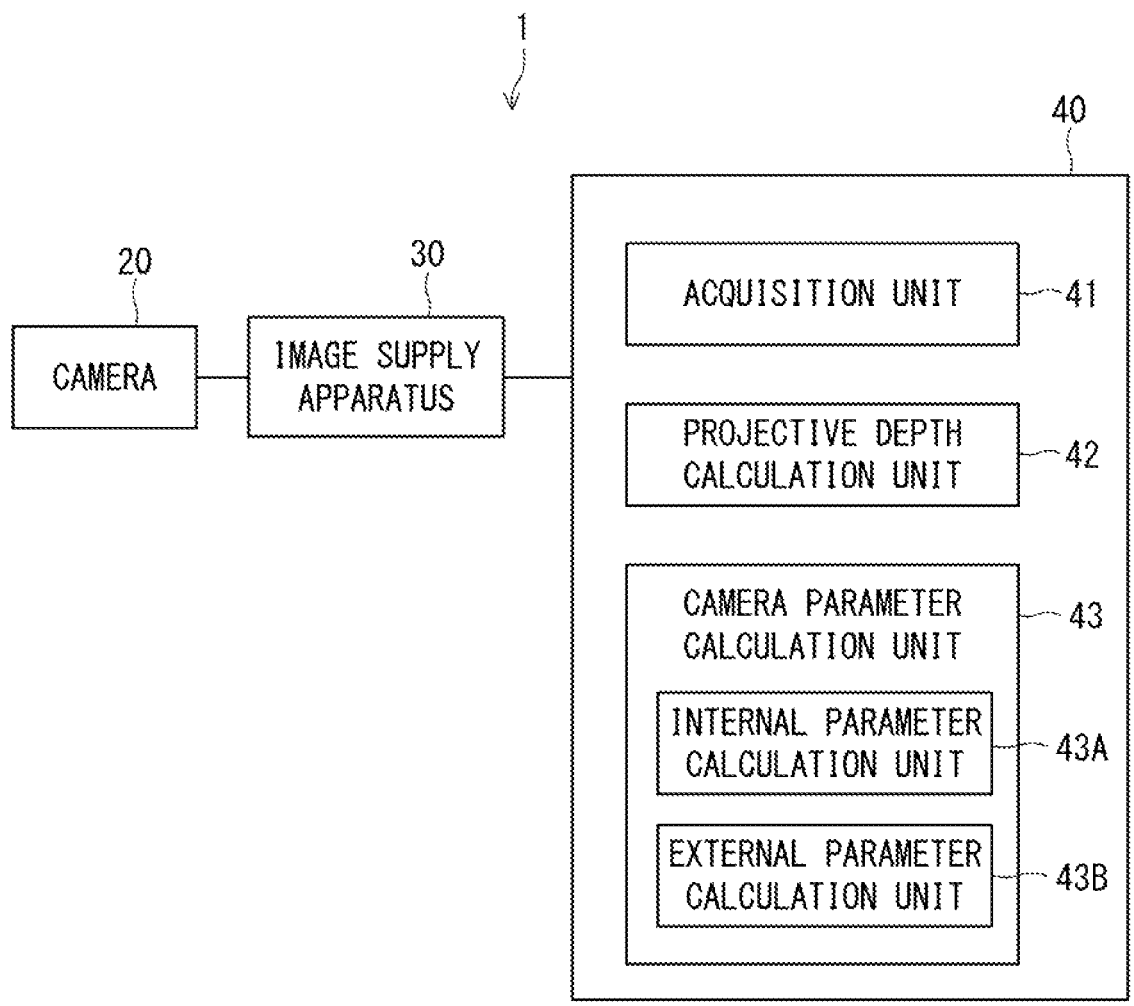
FIG. 2 is a block diagram showing an example of a camera system according to a second example embodiment.

FIG. 2 is a block diagram showing an example of a camera system according to the second example embodiment. In FIG. 2, the camera system 1 includes a camera 20, an image supply apparatus 30, and a camera calibration apparatus 40.

The camera 20 photographs a photographing target area in the "world coordinate system" to form an image P1.

Figure 3:
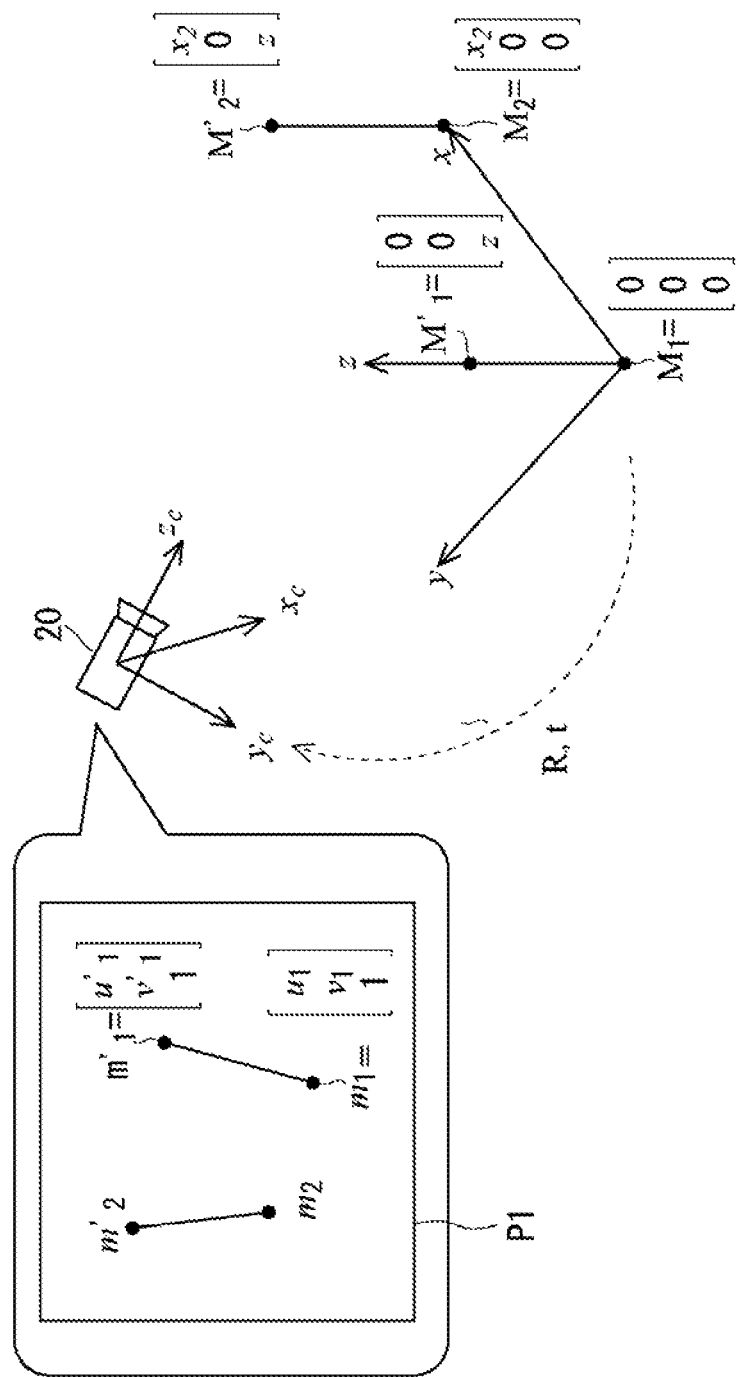
FIG. 3 is a diagram for explaining a relationship between a camera coordinate system and a world coordinate system.

The relationship between the "camera coordinate system" of the camera 20 and the "world coordinate system" will now be described. FIG. 3 is a diagram for explaining the relationship between the camera coordinate system and the world coordinate system.

An origin of the world coordinate system matches a start point ($M_1$) of the first normal vector in the world coordinate space. An end point ($M'_1$) of the first normal vector in the world coordinate space is located on a z axis of the world coordinate system. A start point ($M_2$) of the second normal vector in the world coordinate space is located on an x axis of the world coordinate system. That is, a straight line connecting the start point of the first normal vector in the world coordinate space ($M_1$) to the start point of the second normal vector in the world coordinate space ($M_2$) matches the x axis of the world coordinate system. A direction orthogonal to both the x axis and the z axis is defined as a y axis. That is, the "reference plane" matches an xy plane of the world coordinate system. Since the lengths of the first normal vector in the world coordinate space and the second normal vector in the world coordinate space are the same, a z coordinate of the end point ($M'_1$) of the first normal vector in the world coordinate space and an end point ($M'_2$) of the second normal vector in the world coordinate space are both "z".

In this example embodiment, since the three-dimensional coordinates of the world coordinate system are not explicitly given, the world coordinate system and the camera coordinate system may be freely defined as long as they are relatively equivalent. Therefore, as shown in FIG. 3, the generality is not lost even if the world coordinate system and the camera coordinate system are set. Note that in FIG. 3, R represents a rotation vector, and t represents a translation vector. That is, a position and an orientation of the camera 20 relative to the world coordinates are represented by the rotation matrix R and the translation vector t.

Returning to the description of FIG. 2, the image supply apparatus 30 acquires an image formed by the camera 20, and supplies the acquired image to the camera calibration apparatus 40. For example, the image supply apparatus 30 may transmit the acquired image to the camera calibration apparatus 40 via a communication unit (not shown). The image may be a single still image at a certain time, each frame image of a continuous moving image of time series, or a plurality of still images of different time series.

<Configuration Example of Camera Calibration Apparatus>

In FIG. 2, the camera calibration apparatus 40 includes an acquisition unit 41, a projective depth calculation unit 42, and a camera parameter calculation unit 43. The camera parameter calculation unit 43 includes an internal parameter calculation unit 43A and an external parameter calculation unit 43B.

In a manner similar to the acquisition unit 11 according to the first example embodiment, the acquisition unit 41 acquires the plurality of "normal vectors in the image plane" in the "image plane" of the image supplied from the image supply apparatus 30. For example, in the image supplied from the image supply apparatus 30, the acquisition unit 41 may automatically acquire, by image processing, line segments of an artifact, such as a building or a box, which are perpendicular to or in contact with the ground. Alternatively, the acquisition unit 41 may automatically acquire a backbone joint in each frame image as a normal vector by combining tracking of a specific person in the moving image supplied from the image supply apparatus 30 and the joint detection. Further alternatively, the acquisition unit 41 may accept designation of the "normal vector in the image plane" for the image supplied from the image supply apparatus 30 by a user's manual input. Note that as described in the first example embodiment, the plurality of "normal vectors in the image plane" acquired by the acquisition unit 41 include the "first normal vector in the image plane" and the "second normal vector in the image plane" corresponding to the "first normal vector in the world coordinate space" and the "second normal vector in the world coordinate space", respectively.

In a manner similar to the projective depth calculation unit 12 according to the first example embodiment, the projective depth calculation unit 42 calculates a "projective depth vector" having, as vector elements, four "projective depths" corresponding to the first start point and the first end point of the first normal vector in the image plane and the second start point and the second end point of the second normal vector in the image plane, respectively. The calculation of the "projective depth vector" will be described later in detail.

The internal parameter calculation unit 43A calculates a focal length f of the camera 20 based on the projective depth vector calculated by the projective depth calculation unit 42, and the first start point vector in the image plane, the first end point vector in the image plane, the second start point vector in the image plane, and the second end point vector in the image plane. The focal length f of the camera 20 is one of the internal parameters. In the calculation of the focal length f, for example, an orthogonal relation between each of two column vectors of the rotation matrix R is used. The calculation of the internal parameters will be described in detail later.

The external parameter calculation unit 43B calculates the rotation matrix R and the translation vector t based on the projective depth vector calculated by the projective depth calculation unit 42, the first start point vector in the image plane, the first end point vector in the image plane, the second start point vector in the image plane, the second end point vector in the image plane, and the focal length f calculated by the internal parameter calculation unit 43A. The calculation of the external parameter will be described in detail later.

<Operation Example of Camera Calibration Apparatus>

Figure 4:
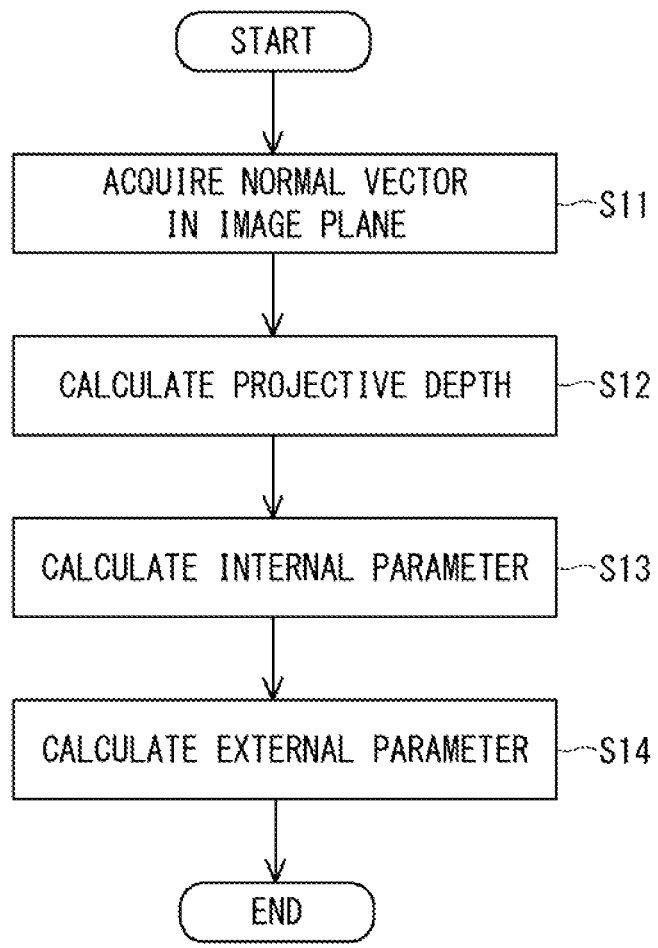
FIG. 4 is a flowchart showing an example of a processing operation of the camera calibration apparatus according to the second example embodiment.

FIG. 4 is a flowchart showing an example of the processing operation of the camera calibration apparatus according to the second example embodiment.

The acquisition unit 41 acquires the first normal vector in the image plane and the second normal vector in the image plane from the image photographed by the camera 20 (Step S11).

The projective depth calculation unit 42 calculates a "projective depth vector" having, as vector elements, four "projective depths" corresponding to the first start point and the first end point of the first normal vector in the image plane and the second start point and the second end point of the second normal vector in the image plane, respectively (Step S12).

The internal parameter calculation unit 43A calculates the focal length f of the camera 20 based on the projective depth vector calculated in Step S12, the first start point vector in the image plane, the first end point vector in the image plane, the second start point vector in the image plane, and the second end point vector in the image plane (Step S13).

The external parameter calculation unit 43B calculates the rotation matrix R and the translation vector t based on the projective depth vector calculated by the projective depth calculation unit 42 in Step S12, the first start point vector in the image plane, the first end point vector in the image plane, the second start point vector in the image plane, and the second end point vector in the image plane, the focal length f calculated in Step S13 (Step S14).

Here, the calculation of the projective depth vector, the internal parameter, and the external parameter will be described in detail using a specific example. In the following description, the symbols shown in FIG. 3 are used. That is, the origin of the world coordinate system matches the start point $M_1 = [0, 0, 0]^T$ of the first normal vector in the world coordinate space. The end point $M'_1$ of the first normal vector in the world coordinate space is located on the z axis of the world coordinate system, and $M'_1 = [0, 0, 0]^T$. The x axis matches a straight line connecting the start point $M_1$ to the start point $M_2$ ($M_2 = [x_2, 0, 0]^T$) of the second normal vector in the world coordinate space. The camera 20 is located at the position of the rotation matrix R and the translation vector t from the origin of the world coordinate system. A start point $M_i = [x_i, 0, 0]^T$ and an end point $= [x_i, 0, z]^T$ of an i-th normal vector in the world coordinate space are observed as $m_i = [u_i, v_i, 1]^T$ and $m'_i = [u'_i, v'_i, 1]^T$ on the image plane, respectively. Here, $m_i$ and $m'_i$ are represented by a homogeneous coordinate system. A superscript T represents a transposition of a vector or a matrix. Since digital cameras have no skew, and the optical center can be substantially approximated to the image center with digital cameras, when the camera 20 is a digital camera, an unknown internal parameter shall be the focal length f.

First, the problem to be solved shall be defined.

The start point and the end point of the i-th world coordinate space normal vector can be projected from the three-dimensional space to the image coordinates using the Formula (1).

[Formula 1]

$$\lambda_i m_i = K(RM_i + t) \\ \lambda'_i m'_i = K(RM'_i + t) \\ K = \begin{bmatrix} f & 0 & 0 \\ 0 & f & 0 \\ 0 & 0 & 1 \end{bmatrix}$$ (1)

Here, $\lambda_i$ represents a projective depth of a start point of an i-th normal vector in an image plane, and $\lambda'_i$ represents a projective depth of an end point of an i-th normal vector in the image plane. K represents an internal parameter matrix.

When the Formula (1) is written down for the first normal vector in the image plane, the second normal vector in the image plane, the first world coordinate space normal vector, and the second world coordinate space normal vector, it can be expressed as the Formula (2).

[Formula 2]

$$\lambda_1 m_1 = Kt \\ \lambda'_1 m'_1 = K(zr_3 + t) \\ \lambda_2 m_2 = K(x_2 r_1 + t) \\ \lambda'_2 m'_2 = K(x_2 r_1 + zr_3 + t)$$ (2)

Here, $r_j$ represents a j-th column vector in the rotation matrix R.

When a difference between the first expression and the second expression in the Formula (2) is obtained and a difference between the third expression and the fourth expression is obtained, the Formula (3) is obtained.

[Formula 3]

$$\lambda'_1 m'_1 - \lambda_1 m_1 = zKr_3 \\ \lambda'_2 m'_2 - \lambda_2 m_2 = zKr_3$$ (3)

Since the Formula (3) indicates that the first expression is equal to the second expression, when the difference between the first expression and the second expression is obtained, the Formula (4) is obtained.

[Formula 4]

$$\lambda'_1 m'_1 - \lambda_1 m_1 - (\lambda'_2 m'_2 - \lambda_2 m_2) = [-m_1 \ m'_1 \ m_2 \ -m'_2] \begin{bmatrix} \lambda_1 \\ \lambda'_1 \\ \lambda_2 \\ \lambda'_2 \end{bmatrix} = A\lambda = 0 \quad (4)$$

The Formula (4) shows that the projective depth is a zero space of a matrix A of 3×4. In other words, the projective depth vector $[\lambda_1, \lambda'_1, \lambda_2, \lambda'_2]^T$ is the zero space of the matrix A in which a first start point vector $m_1$ in the image plane, a first end point vector $m'_1$ in the image plane, a second start point vector $m_2$ in the image plane, and a second end point vector $m'_2$ in the image plane are used as matrix elements. That is, a rate of each projective depth can be calculated excluding scale uncertainty. Although there is an indefinite sign, since the sign of the projective depth based on the Formula (1) is positive, all the signs of $\lambda$ may be selected to be positive.

Next, a method of calculating the focal length using the calculated projective depth will be described.

By substituting the third expression and the fourth expression of the Formula (2) into the Formula (4) and rearranging them, and by substituting the second expression and the fourth expression of the Formula (2) into the Formula (4) and rearranging them, the Formula (5) is obtained.

[Formula 5]

$$\left. \begin{array}{l} K^{-1}(\lambda'_1 m'_1 - \lambda_1 m_1) = zr_3 \\ K^{-1}(\lambda_2 m_2 - \lambda_1 m_1) = x_2 r_1 \end{array} \right\} \quad (5)$$

When orthonormality of the rotation matrix ($r_1^T r_3 = 0$) is used, the Formula (6) is obtained for the focal length f.

[Formula 6]

$$(\lambda'_1 m'_1 - \lambda_1 m_1)^T K^{-T} K^{-1}(\lambda_2 m_2 - \lambda_1 m_1) = (\lambda'_1 - \lambda_1)(\lambda_2 - \lambda_1)$$
$$f^2 + (\lambda'_1 n'_1 - \lambda_1 n_1)^T (\lambda_2 n_2 - \lambda_1 n_1) = 0 \quad (6)$$

In the Formula (6). n_i=[u_i,v_i].

The Formula (6) is a quadratic equation for f. A solution of the the Formula (6) with a positive sign may be obtained. In this way, the internal parameter can be calculated.

Next, a method of calculating the rotation matrix R and the translation vector t, which are the external parameters, will be described.

Since an L2 norm of each column vector of the rotation matrix R is 1, the Formula (7) can be obtained from the Formula (5). // //represents the L2 norm.

[Formula 7]

$$\left. \begin{array}{l} z = \|K^{-1}(\lambda'_1 m'_1 - \lambda_1 m_1)\| \\ r_3 = \frac{1}{z} K^{-1}(\lambda'_1 m'_1 - \lambda_1 m_1) \\ x_2 = \|K^{-1}(\lambda_2 m_2 - \lambda_1 m_1)\| \\ r_1 = \frac{1}{x_2} K^{-1}(\lambda_2 m_2 - \lambda_1 m_1) \end{array} \right\} \quad (7)$$

Heights z of the first normal vector in the world coordinate space and the second normal vector in the world coordinate space and an x axis coordinate $x_2$ of the second normal vector in the world coordinate space have positive signs according to the definition of the world coordinate system. Therefore, the rotation matrix R can be expressed by the Formula (8).

[Formula 8]

$$R = [r_1 \pm r_3 \times r_1 r_3] \quad (8)$$

Although the second column vector of the rotation matrix R has an indefinite positive sign, a sign in which a determinant of the rotation matrix R becomes det (R)=1 may be selected. Thus, the rotation matrix R can be calculated by the Formulas (7) and (8).

The translation vector t can be expressed by the Formula (9) using the first expression of the Formula (2).

[Formula 9]

$$t = \lambda_1 K^{-1} m_1 \quad (9)$$

In this way, the translation vector t can be calculated by the Formula (9).

As described above, according to the second example embodiment, in the camera calibration apparatus 40, the acquisition unit 41 acquires the first normal vector in the image plane and the second normal vector in the image plane, which respectively correspond to the first normal vector in the world coordinate space and the second normal vector in the world coordinate space, which are normal vectors with respect to the reference plane in the world coordinate space and have the same length. The projective depth calculation unit 42 calculates the projective depth vector using, as vector elements, the four projective depths respectively corresponding to the start point and the end point of the first normal vector in the image plane and the start point and the end point of the second normal vector in the image plane.

With such a configuration of the camera calibration apparatus 40, the projective depth vector can be calculated, and thus the internal parameter and the external parameter can be calculated without using a calibration board. That is, the internal parameter and external parameter can be calculated by a simpler method. In addition, it is possible to calibrate a monocular camera using only image information under a condition where the three-dimensional coordinates are unknown. The reason for this is as follows. First, from the Formula (2), the number of unknown variables is 13 ($\lambda_1$, $\lambda'_1$, $\lambda_2$, $\lambda'_2$, $x_2$, z, f, t, three-axis rotation angle of the rotation matrix R). However, since there is scale uncertainty between the projective depth and the three-dimensional coordinates $x_2$, z, the actual degree of freedom is 12. On the other hand, since six constraint conditions ($m_i = [u_i, v_i, 1]^T$, $m'_i = [u_i, v_i, 1]^T$) can be observed as coordinates of a start point and an end point of one normal vector in the image plane, the number of constraint conditions is twelve for two normal vectors in the image plane. In this way, the degree of freedom of the unknown variables and the number of constraint conditions are the same, and thus the problem can be solved.

<Modified Example>

The camera system 1 according to the second example embodiment can be modified as follows.

<1> The settings of the world coordinate system and the camera coordinate system are not limited to the above settings. For example, the setting may be as follows. Specifically, an origin of the camera coordinate system is located on a z axis of the world coordinate system and has coordinates [0, 0, h] of the world coordinate system (=c). Further, a $z_c$ axis of the camera coordinate system corresponds to an optical axis of the camera 20. A projection of the $z_c$ axis on an xy plane of the world coordinate system overlaps a y axis of the world coordinate system. That is, when viewed from a +z direction of the world coordinate system, the $z_c$ axis of the camera coordinate system and the y axis of the world coordinate system overlap each other. Even with such a configuration, since the number of unknown variables does not change, if two or more normal vectors can be obtained, a rotation matrix and a translation vector can be obtained. Since different three-dimensional coordinate systems can be matched by similarity transformation, it is a mathematically equivalent problem.

<2> The reference plane is not limited to the horizontal plane. For example, a line segment parallel to the floor surface may be defined as a normal vector in the world coordinate space using a wall surface as the reference plane.

<3> If three or more normal vectors in the image plane can be obtained, the known RANSAC (Random Sample Consensus) or weighted least squares method may be used to calculate solutions for plausible projective depth vector, internal parameter, and external parameter.

Third Example Embodiment

In a third example embodiment, the three-dimensional coordinates of the start point and the end point of each of the first normal vector in the world coordinate space and the second normal vector in the world coordinate space are calculated based on the first normal vector in the image plane, the second normal vector in the image plane, and the internal parameter, and the external parameter. A basic configuration of the camera system according to the third example embodiment is the same as that of the camera system 1 according to the second example embodiment, and thus will be described with reference to FIG. 2. That is, the camera system 1 according to the third example embodiment includes a camera calibration apparatus 50 shown in FIG. 5 in place of the camera calibration apparatus 40.

<Configuration Example of Camera Calibration Apparatus>

Figure 5:
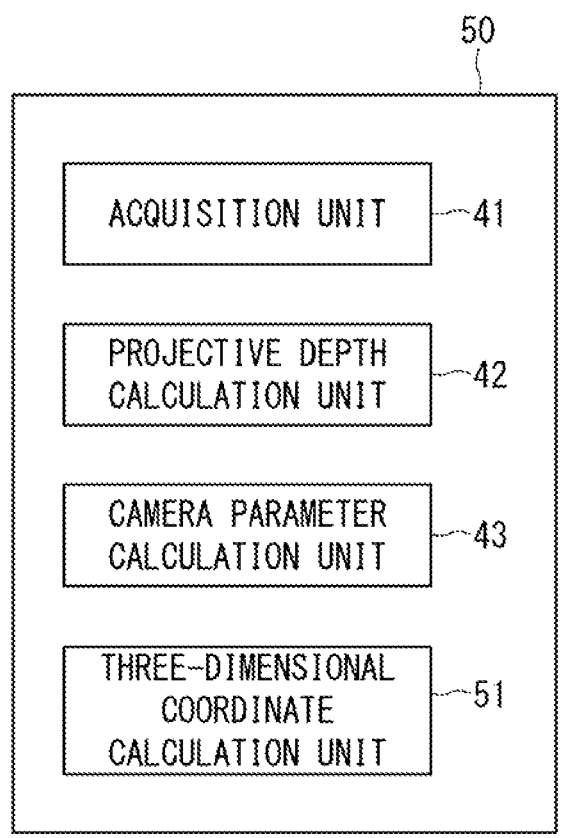
FIG. 5 is a block diagram for explaining a camera calibration apparatus according to a third example embodiment.

FIG. 5 is a block diagram showing an example of the camera calibration apparatus according to the third example embodiment. In FIG. 5, the camera calibration apparatus 50 includes a three-dimensional coordinate calculation unit 51.

The three-dimensional coordinate calculation unit 51 calculates two three-dimensional coordinates in the world coordinate system about the start point coordinates and the end point coordinates of each normal vector in the image plane based on the first normal vector in the image plane and the second normal vector in the image plane acquired by the acquisition unit 41, and the internal parameter and the external parameter calculated by the camera parameter calculation unit 43. That is, the three-dimensional coordinate calculation unit 51 calculates the three-dimensional coordinates of the start point and the end point of each of the first normal vector in the world coordinate space and the second normal vector in the world coordinate space, based on the first normal vector in the image plane and the second normal vector in the image plane acquired by the acquisition unit 41 and the internal parameter and the external parameter calculated by the camera parameter calculation unit 43.

When the Formula (1) is deformed, the Formula (10) or Formula (11) is obtained. The Formula (10) is for obtaining the three-dimensional coordinates when the length of the first normal vector in the world coordinate space is the same as the length of the second normal vector in the world coordinate space. On the other hand, the Formula (11) is for obtaining the three-dimensional coordinates when the length of the first normal vector in the world coordinate space is different from the length of the second normal vector in the world coordinate space. The deformation of the Formula (1) here utilizes the fact that a cross product of both sides of the Formula (1) is zero, because the vectors of both sides of the Formula (1) are equal. The same applies to the second expression of the Formula (1).

[Formula 10]

$$(K^{-1}m_i) \times (x_i r_1 + y_i r_2 + t) = 0 \qquad (10)$$

$$(K^{-1}m'_i) \times (x_i r_1 + y_i r_2 + z r_3 + t) = 0$$

$$\Leftrightarrow \begin{bmatrix} (K^{-1}m_i) \times r_1 & (K^{-1}m_i) \times r_2 \\ (K^{-1}m'_i) \times r_1 & (K^{-1}m'_i) \times r_2 \end{bmatrix} \begin{bmatrix} x_i \\ y_i \end{bmatrix} = \begin{bmatrix} -(K^{-1}m_i) \times t \\ -(K^{-1}m'_i) \times (z r_3 + t) \end{bmatrix}$$

[Formula 11]

$$(K^{-1}m_i) \times (x_i r_1 + y_i r_2 + t) = 0 \qquad (11)$$

$$(K^{-1}m'_i) \times (x_i r_1 + y_i r_2 + z_i r_3 + t) = 0$$

$$\Leftrightarrow \begin{bmatrix} (K^{-1}m_i) \times r_1 & (K^{-1}m_i) \times r_2 & 0 \\ (K^{-1}m'_i) \times r_1 & (K^{-1}m'_i) \times r_2 & (K^{-1}m'_i) \times r_3 \end{bmatrix} \begin{bmatrix} x_i \\ y_i \\ z_i \end{bmatrix} = \begin{bmatrix} -(K^{-1}m_i) \times t \\ -(K^{-1}m'_i) \times t \end{bmatrix}$$

Each of the vectors $r_1$, $r_2$, and $r_3$ represent a column vector of the rotation matrix R, and $[x_i, y_i]$ and $[x_i, y_i, z_i]$ represent the three-dimensional coordinates to be calculated. In the Formula (10), $z_i$ is z.

The Formulas (10) and (11) are linear simultaneous equations and can be easily solved.

<Operation Example of Camera Calibration Apparatus>

Figure 6:
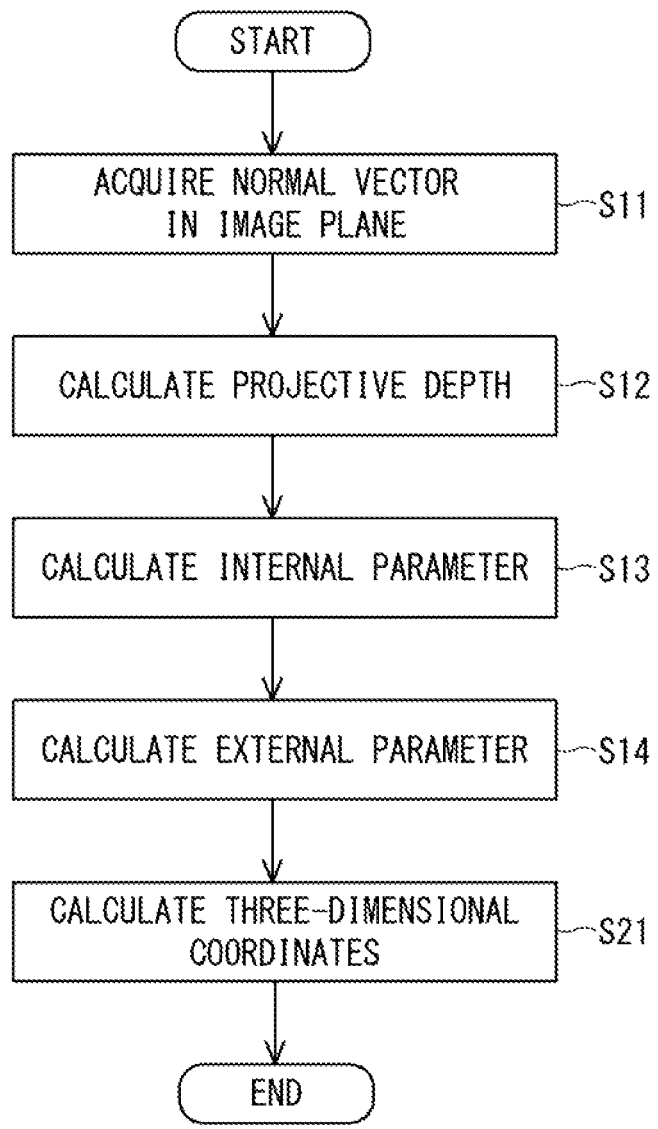
FIG. 6 is a flowchart showing an example of a processing operation of the camera calibration apparatus according to the third example embodiment.

FIG. 6 is a flowchart showing an example of the processing operation of the camera calibration apparatus according to the third example embodiment. In the flowchart of FIG. 6, Steps S11 to S14 are the same as the steps in the flowchart of FIG. 4.

The three-dimensional coordinate calculation unit 51 calculates the three-dimensional coordinates of the start point and the end point of each of the first normal vector in the world coordinate space and the second normal vector in the world coordinate space, based on the first normal vector in the image plane and the second normal vector in the image plane acquired in Step S11 and the internal parameter and the external parameter calculated in Steps S13 and S14 (Step S21).

<Modified Example>

The camera system 1 according to the third example embodiment can be modified as follows.

<1> The formulas for calculating the three-dimensional coordinates of the start point and the end point of each of the first normal vector in the world coordinate space and the second normal vector in the world coordinate space are not limited to the Formulas (10) and (11). For example, the three-dimensional coordinates may be calculated including the projective depth which is deleted in the Formulas (10) and (11).

<2> The three-dimensional coordinate calculation unit 51 may calculate absolute three-dimensional coordinates based on the length of the normal vector in the world coordinate space corresponding to at least one of the plurality of normal vectors in the image plane or the coordinates on the z axis of the origin of the camera coordinate system, in addition to the plurality of normal vectors in the image plane, the internal parameter, and the external parameter. That is, when an absolute length (e.g., in meters) of the normal vector in the world coordinate space corresponding to at least one of the plurality of acquired normal vectors in the image plane is known, the three-dimensional coordinates of the camera position and the normal vector in the world coordinate space, which are relative relations, can be converted into absolute relations using the absolute length. For example, when the z coordinate of the end point of the j-th normal vector in world coordinate space is known as $z_j=a$, the three-dimensional coordinates of another normal vector in the world coordinate space and the position $c=-R^T t$ of the camera may be multiplied by $a/z_j$. This processing may be executed by the three-dimensional coordinate calculation unit 51 after the three-dimensional coordinate calculation unit 51 receives $z_j=a$ as an input and before outputs the calculated results, or may be executed as post-processing after the output of the camera calibration apparatus 50.

Fourth Example Embodiment

A fourth example embodiment relates to optimization processing for the internal parameter, the external parameter, and two three-dimensional coordinates about each normal vector in an image plane calculated by a three-dimensional coordinate calculation unit. A basic configuration of a camera system according to a fourth example embodiment related to the is the same as that of the camera system 1 according to the second example embodiment, and thus will be described with reference to FIG. 2. That is, the camera system 1 according to the fourth example embodiment includes a camera calibration apparatus 60 shown in FIG. 7 in place of the camera calibration apparatus 40.

<Configuration Example of Camera Calibration Apparatus>

Figure 7:
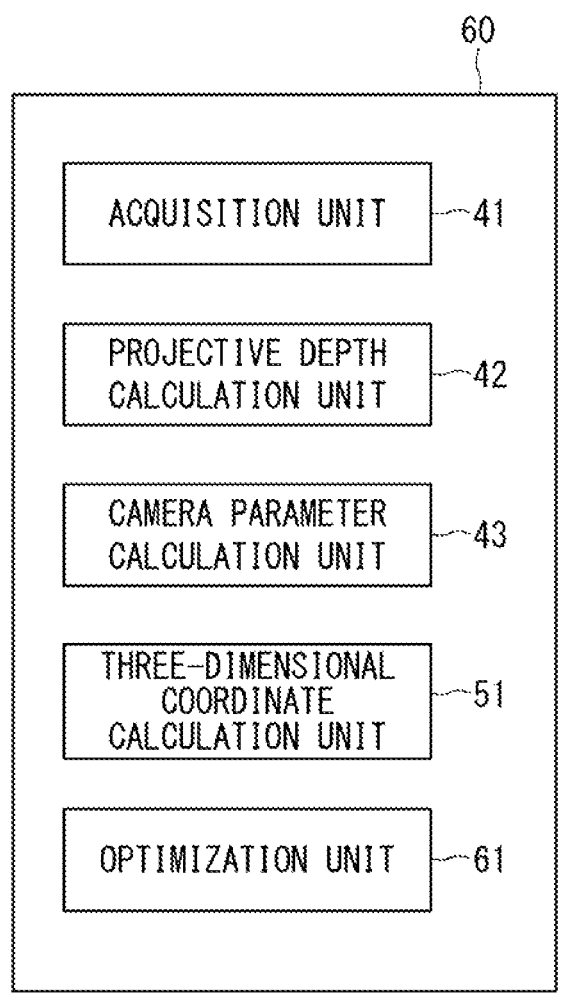
FIG. 7 is a block diagram showing an example of a camera calibration apparatus according to a fourth example embodiment.

FIG. 7 is a block diagram showing an example of the camera calibration apparatus according to the fourth example embodiment. In FIG. 7, the camera calibration apparatus 60 includes an optimization unit 61.

The optimization unit 61 executes "optimization processing" of the internal parameter, the external parameter, and two three-dimensional coordinates of each normal vector in an image plane calculated by the three-dimensional coordinate calculation unit 51. For example, the optimization unit 61 calculates two "reprojection coordinates" obtained by projecting the three-dimensional coordinates of the start point and the end point of each of the first normal vector in the world coordinate space and the second normal vector in the world coordinate space onto the image plane using the internal parameter and the external parameter calculated by the camera parameter calculation unit 43.

Then, the optimization unit 61 obtains the adjusted internal parameter, the adjusted external parameter, and the adjusted two three-dimensional coordinates, which are expected to minimize a "re-projection error" which is an error between the two "re-projection coordinates" of each first normal vector in the world coordinate space and the second normal vector in the world coordinate space and the start point and end point of each of the first normal vector in the image plane and the second normal vector in the image plane. By doing so, the internal parameter and the external parameter of the camera 20 and the two three-dimensional coordinates can be optimized.

For example, the optimization unit 61 may perform non-linear optimization based on the Formula (12) using the three-dimensional coordinates calculated by the three-dimensional coordinate calculation unit 51 and the internal parameter and the external parameter calculated by the camera parameter calculation unit 43 as initial values. The optimization unit 61 may optimize each parameter by solving the Formula (12) using, for example, a known method such as the Levenberg-Marquardt method or the trust region method. Here, the optimization unit 61 may set at least one of the focal length, a skew, an optical center, and lens distortion of the camera 20 as the internal parameter to be optimized.

[Formula 12]

$$\min_{R,t,f,x_i,y_i,z_i(\in n)} \sum_{i=1} \|m_i - Proj(K(RM_i + t))\|^2 + \|m'_i - Proj(K(RM'_i + t))\|^2 \quad (12)$$

$$\text{s.t. } R^T R = I, x_1 = 0, y_1 = 0, z_1 = 0, y_2 = 0, \frac{x_2}{z_2} = \text{constant}$$

In this formula, Proj represents a function for dividing each of first and second components by a third component of a three-dimensional vector and converting them into a homogenized coordinate system.

Because of the homogenization, there is no need to optimize the projective depth. The constraint condition on the three-dimensional coordinates of the Formula (12) is for removing the relative uncertainty.

The Formulas (4) and (7) to (9) are based on a linear simultaneous formula that minimize so-called algebraic errors. In addition, since the projective depth, the focal length, the rotation matrix, the translation vector, and the three-dimensional coordinates are calculated in order, there is a possibility that errors may accumulate in the later stage. Therefore, by minimizing the so-called re-projection error represented by Formula (12), the error between parameters can be homogenized and a statistically optimum parameter can be calculated.

<Operation Example of Camera Calibration Apparatus>

Figure 8:
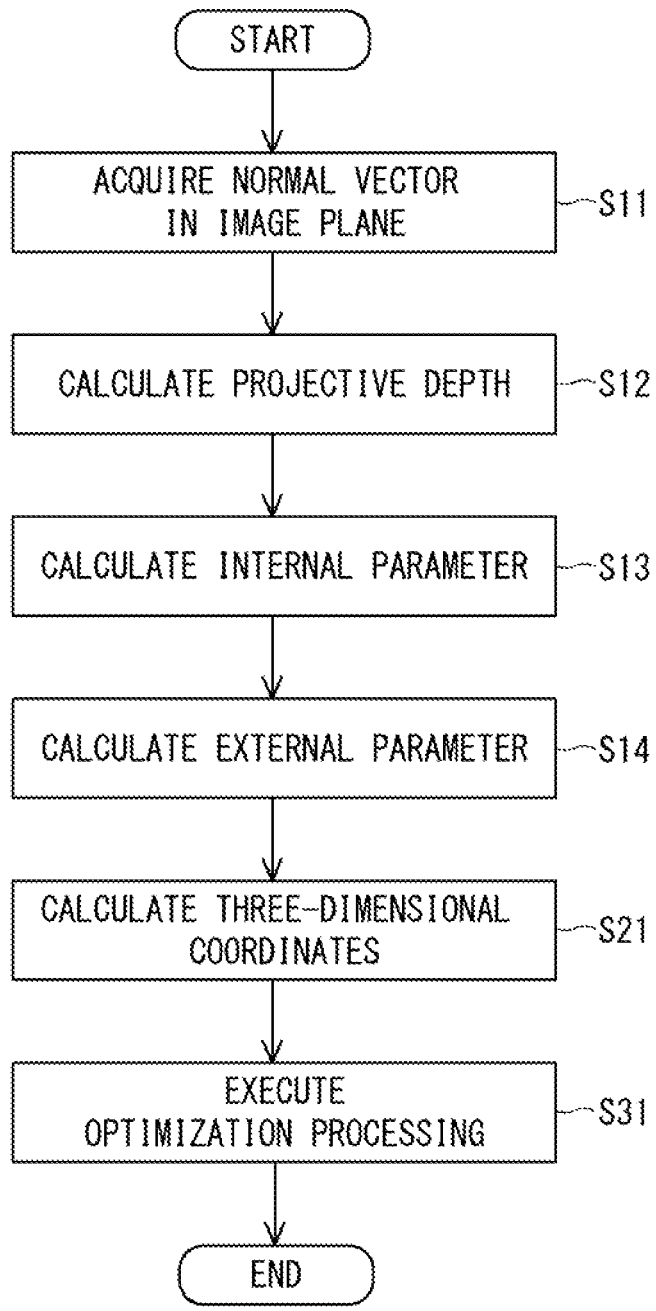
FIG. 8 is a flowchart showing an example of a processing operation of the camera calibration apparatus according to the fourth example embodiment.

FIG. 8 is a flowchart showing an example of the processing operation of the camera calibration apparatus according to the fourth example embodiment.

The optimization unit 61 executes the "optimization processing" for the internal parameter and the external parameter calculated in Steps S13 and S14 and the two three-dimensional coordinates of each normal vector in the image plane calculated in Step S21 (Step S31).

<Modified Example>

The camera system 1 according to the fourth example embodiment can be modified as follows.

<1> In the calculation of the above Formula (12), it is not necessary to optimize all the parameters. For example, as described in the modified example <2> of the third example embodiment, when there is a normal vector in the world coordinate space whose length is known, the three-dimensional coordinates of both end points of this normal vector may be a fixed value instead of a variable. This reduces the number of unknown variables, so that the optimization of Formula (12) can be performed more stably.

<2> Although the lens distortion is not obtained by the internal parameter calculation unit 43A, the lens distortion may be included in the parameter to be optimized in the Formula (12). That is, even if the normal vector in the image plane becomes a curve on the image due to the lens distortion, a final solution can be obtained by including the lens distortion as an unknown variable in the calculation of the Formula (12) after the processing up to Step S21 is performed using the normal vector in the image plane at the image center with small lens distortion or assuming that the lens distortion is small. In this way, the optimization unit 61 can obtain the lens distortion.

Other Example Embodiments

Figure 9:
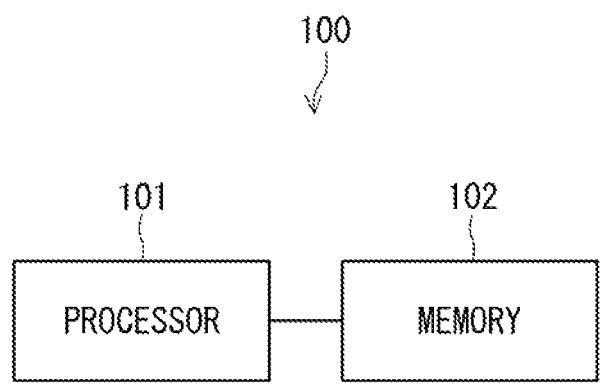
FIG. 9 is a diagram showing an example of a hardware configuration of the camera calibration apparatus.

FIG. 9 shows an example of a hardware configuration of the camera calibration apparatus. In FIG. 9, a camera calibration apparatus 100 includes a processor 101 and a memory 102. The processor 101 may be, for example, a microprocessor, a Micro Processing Unit (MPU), or a Central Processing Unit (CPU). The processor 101 may include a plurality of processors. The memory 102 is composed of a combination of a volatile memory and a non-volatile memory. The memory 102 may include a storage separated from the processor 101. In this case, the processor 101 may access the memory 102 via an I/O interface (not shown).

Each of the camera calibration apparatuses 10, 40, 50, and 60 according to the first to fourth example embodiments, respectively, can have the hardware configuration shown in FIG. 9. The acquisition units 11 and 41, the projective depth calculation units 12 and 42, the camera parameter calculation units 13 and 43, the three-dimensional coordinate calculation unit 10, and optimization unit 40 of the camera calibration apparatuses 51, 61, 50, and 60 according to the first to fourth example embodiments may be implemented by the processor 101 reading and executing a program stored in the memory 102. The program can be stored and provided to the camera calibration apparatuses 10, 40, 50, and 60 using any type of non-transitory computer readable media. Examples of non-transitory computer readable media include magnetic storage media (such as floppy disks, magnetic tapes, hard disk drives, etc.), optical magnetic storage media (e.g. magneto-optical disks) of tangible storage media. Examples of non-transitory computer readable media further include CD-ROM (Read Only Memory), CD-R, CD-R/W. Examples of non-transitory computer readable media further include semiconductor memories. Semiconductor memories (such as mask ROM, PROM (Programmable ROM), EPROM (Erasable PROM), flash ROM, RAM (Random Access Memory), etc.). The program may be provided to the camera calibration apparatuses 10, 40, 50, and 60 using any type of transitory computer readable media. Examples of transitory computer readable media include electric signals, optical signals, and electromagnetic waves. Transitory computer readable media can provide the program to camera calibration apparatuses 10, 40, 50, and 60 via a wired communication line (e.g. electric wires, and optical fibers) or a wireless communication line.

Although the present disclosure has been described with reference to the example embodiments, the present disclosure is not limited to the above. The configuration and details of the present disclosure can be modified in various ways that will be understood by those skilled in the art within the scope of the disclosure.

The whole or part of the example embodiments disclosed above can be described as, but not limited to, the following supplementary notes.

(Supplementary Note 1)

A camera calibration apparatus comprising:

an acquisition unit configured to acquire, in an image plane of an image obtained by photographing a world coordinate space using a camera, a first normal vector in the image plane and a second normal vector in the image plane respectively corresponding to a first normal vector in the world coordinate space and a second normal vector in the world coordinate space which are normal vectors with respect to a reference plane in the world coordinate space and have the same length;

a projective depth calculation unit configured to calculate a projective depth vector having, as vector elements, four projective depths respectively corresponding to a first start point and a first end point of the first normal vector in the image plane and a second start point and a second end point of the second normal vector in the image plane; and a camera parameter calculation unit configured to calculate an internal parameter and an external parameter of the camera based on the calculated projective depth vector, a first start point vector in the image plane and a first end point vector in the image plane respectively corresponding to the first start point and the first end point, and a second start point vector in the image plane and a second end point vector in the image plane respectively corresponding to the second start point and the second end point.

(Supplementary Note 2)

The camera calibration apparatus according to Supplementary note 1, wherein the projective depth calculation unit is configured to calculate the projective depth vector based on a relation that the projective depth vector is a zero space of a first matrix including the first start point vector in the image plane, the first first end point vector in the image plane, the second start point vector in the image plane, and the second end point vector in the image plane as matrix elements.

(Supplementary Note 3)

The camera calibration apparatus according to Supplementary note 1 or 2, wherein the external parameter includes a rotation matrix and a translation vector, and the camera parameter calculation unit includes an internal parameter calculation unit configured to calculate a focal length of the camera as the internal parameter based on the calculated projective depth vector, the first start point vector in the image plane, the first end point vector in the image plane, the second start point vector in the image plane, the second end point vector in the image plane, and an orthogonal relation between each of two column vectors of the rotation matrix.

(Supplementary Note 4)

The camera calibration apparatus according to Supplementary note 3, wherein the camera parameter calculation unit includes an external parameter calculation unit configured to calculate the rotation matrix and the translation vector based on the calculated projective depth vector, the first start point vector in the image plane, the first end point vector in the image plane, the second start point vector in the image plane, the second end point vector in the image plane, and the calculated focal length.

(Supplementary Note 5)

The camera calibration apparatus according to Supplementary note 4, wherein the world coordinate system is defined such that a start point of the first normal vector in the world coordinate space matches an origin of the world coordinate system, a start point of the second normal vector in the world coordinate space is present on a first axis of the world coordinate system, and an end point of the first normal vector in the world coordinate space is present on a third axis of the world coordinate system.

(Supplementary Note 6)

The camera calibration apparatus according to Supplementary note 5, wherein the internal parameter calculation unit is configured to calculate the focal length of the camera using a Formula (A1).

[Formula 13]

$$(\lambda'_1-\lambda_1)(\lambda'_2-\lambda_1)f^2+(\lambda'_1 n_1-\lambda_1 n_1)^T(\lambda'_2 n_2-\lambda_1 n_1)=0 \quad (A1)$$

In the Formula (A1), $\lambda_1$, $\lambda'_1$, $\lambda_2$, and $\lambda'_2$ respectively represent the projective depths of the first start point, the first end point, the second start point, and the second end point, f represents the focal length, and vectors $n_1$, $n'_1$, $n_2$, and $n'_2$ respectively represent the first start point vector in the image plane, the first end point vector in the image plane, the second start point vector in the image plane, and the second end point vector in the image plane.

(Supplementary Note 7)

The camera calibration apparatus according to Supplementary note 6, wherein the external parameter calculation unit is configured to calculate the rotation matrix using Formulas (A2), (A3), and (A4), and calculate the translation vector using Formulas (A4) and (A5).

[Formula 14]

$$R = [r_1 \quad \pm r_3 \times r_1 \quad r_3] \quad (A2)$$

[Formula 15]

$$\begin{aligned} z &= \|K^{-1}(\lambda'_1 m'_1 - \lambda_1 m_1)\| \\ r_3 &= \frac{1}{z} K^{-1}(\lambda'_1 m'_1 - \lambda_1 m_1) \\ x_2 &= \|K^{-1}(\lambda_2 m_2 - \lambda_1 m_1)\| \\ r_1 &= \frac{1}{x_2} K^{-1}(\lambda_2 m_2 - \lambda_1 m_1) \end{aligned} \quad (A3)$$

[Formula 16]

$$K = \begin{bmatrix} f & 0 & 0 \\ 0 & f & 0 \\ 0 & 0 & 1 \end{bmatrix} \quad (A4)$$

[Formula 17]

$$t = \lambda_1 K^{-1} m_1 \quad (A5)$$

R represents the rotation matrix, vectors $r_1$ and $r_3$ represent column vectors of a first column and a third column of the rotation matrix, respectively, z represents coordinates on the third axis of the end point of the first normal vector in the world coordinate space and an end point of the second normal vector in the world coordinate space, $x_2$ represents coordinates on the first axis of the start point of the second normal vector in the world coordinate space, $\lambda_1$, $\lambda'_1$, $\lambda_2$, and $\lambda'_2$ respectively represent the projective depths of the first start point, the first end point, the second start point, and the second end point, and vectors $m_2$, and $m'_2$ respectively represent the first start point vector in the image plane, the first end point vector in the image plane, the second start point vector in the image plane, and the second end vector in the image plane. // //represents an L2 norm. t represents the translation vector. K represents an internal parameter matrix, and f represents the focal length.

(Supplementary Note 8)

The camera calibration apparatus according to any one of Supplementary notes 5 to 7, further comprising:

a three-dimensional coordinate calculation unit configured to calculate three-dimensional coordinates of the start point and the end point of each of the first normal vector in the world coordinate space and the second normal vector in the world coordinate space based on the first normal vector in the image plane and the second normal vector in the image plane acquired by the acquisition unit and the internal parameter and the external parameter calculated by the camera parameter calculation unit.

(Supplementary Note 9)

The camera calibration apparatus according to Supplementary note 8, wherein the three-dimensional coordinate calculation unit is configured to calculate the three-dimensional coordinates using a Formula (A6).

[Formula 18]

$$\begin{bmatrix} (K^{-1}m_i)\times r_1 & (K^{-1}m_i)\times r_2 \\ (K^{-1}m'_i)\times r_1 & (K^{-1}m'_i)\times r_2 \end{bmatrix}\begin{bmatrix} x_i \\ y_i \end{bmatrix} = \begin{bmatrix} -(K^{-1}m_i)\times t \\ -(K^{-1}m'_i)\times (zr_3+t) \end{bmatrix} \quad (A6)$$

In the Formula (A6), vectors $r_1$, $r_2$, and $r_3$ respectively represent the column vectors of the rotation matrix, vectors $m_i$ and $m_i'$ respectively represent an i-th start point vector in the image plane and an i-th end point vector in the image plane, $x_i$ and $y_i$ represent coordinates of a first axis and a second axis of the world coordinate system of a start point and an end point of an i-th normal vector in the world coordinate space, and z represents coordinates of the third axis of the end point of the first normal vector in the world coordinate space and the end point of the second normal vector in the world coordinate space. t represents the translation vector. K represents an internal parameter matrix expressed by a Formula (A7), and f represents the focal length.

[Formula 19]

$$K = \begin{bmatrix} f & 0 & 0 \\ 0 & f & 0 \\ 0 & 0 & 1 \end{bmatrix} \quad (A7)$$

(Supplementary Note 10)

The camera calibration apparatus according to Supplementary note 8 or 9, further comprising:

an optimization unit configured to optimize the internal parameter and the external parameter of the camera and the three-dimensional coordinates by obtaining the adjusted internal parameter, the adjusted external parameter, and the adjusted two three-dimensional coordinates, the adjusted internal parameter, the adjusted external parameter, and the adjusted two three-dimensional coordinates being expected to minimize a re-projection error, the re-projection error being an error between two re-projection coordinates and the start point and the end point of each of the first normal vector in the image plane and the second normal vector in the image plane, the two reprojection coordinates being obtained by projecting the calculated three-dimensional coordinates of the start point and the end point of each of the first normal vector in the world coordinate space and the second normal vector in the world coordinate space onto the image plane using the internal parameter and the external parameter calculated by the camera parameter calculation unit.

(Supplementary Note 11)

The camera calibration apparatus according to Supplementary note 10, wherein the optimization unit is configured to perform nonlinear optimization using the three-dimensional coordinates calculated by the three-dimensional coordinate calculation unit and the internal parameter and the external parameter calculated by the camera parameter calculation unit as initial values based on a Formula (A8) to thereby optimize the internal parameter and the external parameter of the camera and the three-dimensional coordinates.

[Formula 20]

$$\min_{R,t,f,x_i,y_i,z_i(\in n)} \sum_{i=1} \|m_i - Proj(K(RM_i + t))\|^2 + \|m'_i - Proj(K(RM'_j + t))\|^2 \quad (A8)$$

$$\text{s.t. } R^T R = I, x_1 = 0, y_1 = 0, z_1 = 0, y_2 = 0, \frac{x_2}{z_2} = \text{constant}$$

In the Formula (A8), Proj represents a function for dividing each of first and second components by a third component of a three-dimensional vector and converting the divided first and second components into a homogenized coordinate system, R represents the rotation vector, and t represents the translation vector, vectors $m_i$ and $m_i'$ respectively represent an i-th start point vector in the image plane and an i-th end point vector in the image plane, $M_i$ and $M'_i$ respectively represent a start point vector and an end point vector of an i-th normal vector in an world coordinate space, $x_i$, $y_i$, $z_i$ represent two three-dimensional coordinates of the start point and the end point of the i-th normal vector in the world coordinate space, and // // represents a norm. K represents an internal parameter matrix expressed by a Formula (A9), and f represents the focal length. T represents a transposition of a vector or a matrix.

[Formula 21]

$$K = \begin{bmatrix} f & 0 & 0 \\ 0 & f & 0 \\ 0 & 0 & 1 \end{bmatrix} \quad (A9)$$

(Supplementary Note 12)

The camera calibration apparatus according to Supplementary note 10 or 11, wherein the optimization unit is configured to use at least one of the focal length, a skew, an optical center, and lens distortion of the camera as the internal parameter to be optimized.

(Supplementary Note 13)

A camera system comprising:

the camera calibration apparatus according to any one of Supplementary notes 1 to 12; and an image supply apparatus configured to supply an image obtained by photographing the world coordinate space using the camera to the camera calibration apparatus;

(Supplementary Note 14)

A camera calibration method comprising:

acquiring, in an image plane of an image obtained by photographing a world coordinate space using a camera, a first normal vector in the image plane and a second normal vector in the image plane respectively corresponding to a first normal vector in the world coordinate space and a second normal vector in the world coordinate space which are normal vectors with respect to a reference plane in the world coordinate space and have the same length;

calculating a projective depth vector having, as vector elements, four projective depths respectively corresponding to a first start point and a first end point of the first normal vector in the image plane and a second start point and a second end point of the second normal vector in the image plane; and calculating an internal parameter and an external parameter of the camera based on the calculated projective depth vector, a first start point vector in the image plane and a first end point vector in the image plane respectively corresponding to the first start point and the first end point, and a second start point vector in the image plane and a second end point vector in the image plane respectively corresponding to the second start point and the second end point.

(Supplementary Note 15)

A non-transitory computer readable medium storing a program for causing a computer to execute processing of:

acquiring, in an image plane of an image obtained by photographing a world coordinate space using a camera, a first normal vector in the image plane and a second normal vector in the image plane respectively corresponding to a first normal vector in the world coordinate space and a second normal vector in the world coordinate space which are normal vectors with respect to a reference plane in the world coordinate space and have the same length;

calculating a projective depth vector having, as vector elements, four projective depths respectively corresponding to a first start point and a first end point of the first normal vector in the image plane and a second start point and a second end point of the second normal vector in the image plane; and calculating an internal parameter and an external parameter of the camera based on the calculated projective depth vector, a first start point vector in the image plane and a first end point vector in the image plane respectively corresponding to the first start point and the first end point, and a second start point vector in the image plane and a second end point vector in the image plane respectively corresponding to the second start point and the second end point.

REFERENCE SIGNS LIST

1 Camera System
10 Camera Calibration Apparatus
11 Acquisition Unit
12 Projective Depth Calculation Unit
13 Camera Parameter Calculation Unit
20 Camera
30 Image Supply Apparatus
40 Camera Calibration Apparatus
41 Acquisition Unit
42 Projective Depth Calculation Unit
43 Camera Parameter Calculation Unit
43A Internal Parameter Calculation Unit
43B External Parameter Calculation Unit
50 Camera Calibration Apparatus
51 Three-Dimensional Coordinate Calculation Unit
60 Camera Calibration Apparatus
61 Optimization Unit

What is claimed is:

1. A camera calibration apparatus comprising:
at least one processor; and
at least one memory storing program code executable by the at least one processor to
acquire, in an image plane of an image obtained by photographing a world coordinate space using a camera, a first normal vector in the image plane and a second normal vector in the image plane respectively corresponding to a first normal vector in the world coordinate space and a second normal vector in the world coordinate space which are normal vectors with respect to a reference plane in the world coordinate space and that have the same length;

calculate a projective depth vector having, as vector elements, four projective depths respectively corresponding to a first start point and a first end point of the first normal vector in the image plane and a second start point and a second end point of the second normal vector in the image plane; and calculate an internal parameter and an external parameter of the camera based on the calculated projective depth vector, a first start point vector in the image plane and a first end point vector in the image plane respectively corresponding to the first start point and the first end point, and a second start point vector in the image plane and a second end point vector in the image plane respectively corresponding to the second start point and the second end point.

2. The camera calibration apparatus according to claim 1, wherein
the projective depth vector is calculated based on a relation that the projective depth vector is a zero space of a first matrix including the first start point vector in the image plane, the first first end point vector in the image plane, the second start point vector in the image plane, and the second end point vector in the image plane as matrix elements.

3. The camera calibration apparatus according to claim 1, wherein
the external parameter includes a rotation matrix and a translation vector, and
the program code is executable by the at least one processor to further calculate a focal length of the camera as the internal parameter based on the calculated projective depth vector, the first start point vector in the image plane, the first end point vector in the image plane, the second start point vector in the image plane, the second end point vector in the image plane, and an orthogonal relation between each of two column vectors of the rotation matrix.

4. The camera calibration apparatus according to claim 3, wherein
the program code is executable by the at least one processor to further calculate the rotation matrix and the translation vector based on the calculated projective depth vector, the first start point vector in the image plane, the first end point vector in the image plane, the second start point vector in the image plane, the second end point vector in the image plane, and the calculated focal length.

5. The camera calibration apparatus according to claim 4, wherein
the world coordinate system is defined such that a start point of the first normal vector in the world coordinate space matches an origin of the world coordinate system, a start point of the second normal vector in the world coordinate space is present on a first axis of the world coordinate system, and an end point of the first normal vector in the world coordinate space is present on a third axis of the world coordinate system.

6. The camera calibration apparatus according to claim 5, wherein
the focal length of the camera is calculated using Formula (1),

[Formula 1]

$$(\lambda'_1-\lambda_1)(\lambda_2-\lambda_1)f^2 + (\lambda'_1 n'_1 - \lambda_1 n_1)^T(\lambda_2 n_2 - \lambda_1 n_1) = 0 \quad (1)$$

wherein in the Formula (1), ), $\lambda_1$, $\Delta'_1$, $\Delta_2$, and $\lambda'_2$ respectively represent the projective depths of the first start point, the first end point, the second start point, and the second end point, f represents the focal length, and vectors $n_1$, $n_2$, and $n'_2$ respectively represent the first start point vector in the image plane, the first end point vector in the image plane, the second start point vector in the image plane, and the second end point vector in the image plane.

7. The camera calibration apparatus according to claim 6, wherein
the rotation matrix is calculated using Formulas (2), (3), and (4), and the translation vector is calculated using Formulas (4) and (5),

[Formula 2]

$$R = [r_1 \quad \pm r_3 \times r_1 \quad r_3] \quad (2)$$

[Formula 3]

$$\left. \begin{array}{l} z = \|K^{-1}(\lambda'_1 m'_1 - \lambda_1 m_1)\| \\ r_3 = \dfrac{1}{z} K^{-1}(\lambda'_1 m'_1 - \lambda_1 m_1) \\ x_2 = \|K^{-1}(\lambda_2 m_2 - \lambda_1 m_1)\| \\ r_1 = \dfrac{1}{x_2} K^{-1}(\lambda_2 m_2 - \lambda_1 m_1) \end{array} \right\} \quad (3)$$

[Formula 4]

$$K = \begin{bmatrix} f & 0 & 0 \\ 0 & f & 0 \\ 0 & 0 & 1 \end{bmatrix} \quad (4)$$

[Formula 5]

$$t = \lambda_1 K^{-1} m_1 \quad (5)$$

wherein R represents the rotation matrix, vectors $r_1$ and $r_3$ represent column vectors of a first column and a third column of the rotation matrix, respectively, z represents coordinates on the third axis of the end point of the first normal vector in the world coordinate space and an end point of the second normal vector in the world coordinate space, $x_2$ represents coordinates on the first axis of the start point of the second normal vector in the world coordinate space, $\lambda_1$, $\Delta'_1$, $\Delta_2$, and $\lambda'_2$ respectively represent the projective depths of the first start point, the first end point, the second start point, and the second end point, and vectors $m_1$, $m'_1$, $m_2$, and $m'_2$ respectively represent the first start point vector in the image plane, the first end point vector in the image plane, the second start point vector in the image plane, and the second end vector in the image plane, represents an L2 norm, t represents the translation vector, K represents an internal parameter matrix, and f represents the focal length.

8. The camera calibration apparatus according to claim 5, wherein the program code is executable by the at least one processor to further:
calculate three-dimensional coordinates of the start point and the end point of each of the first normal vector in the world coordinate space and the second normal vector in the world coordinate space based on the first normal vector in the image plane and the second normal vector in the image plane and based on the internal parameter and the external parameter.

9. The camera calibration apparatus according to claim 8, wherein the three-dimensional coordinates is calculated using Formula (6),

[Formula 6]

$$\begin{bmatrix} (K^{-1}m_i) \times r_1 & (K^{-1}m_i) \times r_2 \\ (K^{-1}m'_i) \times r_1 & (K^{-1}m'_i) \times r_2 \end{bmatrix} \begin{bmatrix} x_i \\ y_i \end{bmatrix} = \begin{bmatrix} -(K^{-1}m_i) \times t \\ -(K^{-1}m'_i) \times (zr_3 + t) \end{bmatrix} \quad (6)$$

wherein in the Formula (6), vectors $r_1$, $r_2$, and $r_3$ respectively represent the column vectors of the rotation matrix, vectors $m_i$ and $m_i'$ respectively represent an i-th start point vector in the image plane and an i-th end point vector in the image plane, $x_i$ and $y_i$ represent coordinates of a first axis and a second axis of the world coordinate system of a start point and an end point of an i-th normal vector in the world coordinate space, and z represents coordinates of the third axis of the end point of the first normal vector in the world coordinate space and the end point of the second normal vector in the world coordinate space, t represents the translation vector, K represents an internal parameter matrix expressed by Formula (7), and f represents the focal length,

[Formula 7]

$$K = \begin{bmatrix} f & 0 & 0 \\ 0 & f & 0 \\ 0 & 0 & 1 \end{bmatrix}. \quad (7)$$

10. The camera calibration apparatus according to claim 8, wherein the program code is executable by the at least one processor to further:

optimize the internal parameter and the external parameter of the camera and the three-dimensional coordinates by obtaining the adjusted internal parameter, the adjusted external parameter, and the adjusted two three-dimensional coordinates, the adjusted internal parameter, the adjusted external parameter, and the adjusted two three-dimensional coordinates that are expected to minimize a re-projection error, between two re-projection coordinates and the start point and the end point of each of the first normal vector in the image plane and the second normal vector in the image plane, the two reprojection coordinates obtained by projecting the calculated three-dimensional coordinates of the start point and the end point of each of the first normal vector in the world coordinate space and the second normal vector in the world coordinate space onto the image plane using the internal parameter and the external parameter.

11. The camera calibration apparatus according to claim 10, wherein the internal parameter and the external parameter of the camera and the three-dimensional coordinates are optimized by performing nonlinear optimization using the three-dimensional coordinates and the internal parameter and the external parameter as initial values based on Formula (8),

[Formula 8]

$$\min_{R,t,f,x_i,y_i,z_i(\in n)} \sum_{i=1}^{n} \|m_i - Proj(K(RM_i + t))\|^2 + \|m'_i - Proj(K(RM'_i + t))\|^2 \quad (8)$$

$$\text{s.t. } R^T R = I, x_1 = 0, y_1 = 0, z_1 = 0, y_2 = 0, \frac{x_2}{z_2} = \text{constant}$$

wherein in the Formula (8), Proj represents a function for dividing each of first and second components by a third component of a three-dimensional vector and converting the divided first and second components into a homogenized coordinate system, R represents the rotation vector, and t represents the translation vector, vectors $m_i$ and $m_i'$ respectively represent an i-th start point vector in the image plane and an i-th end point vector in the image plane, $M_i$ and $M'_i$ respectively represent a start point vector and an end point vector of an i-th normal vector in an world coordinate space, $x_i$, $y_i$, $z_i$ represent two three-dimensional coordinates of the start point and the end point of the i-th normal vector in the world coordinate space, and represents a norm, K represents an internal parameter matrix expressed by a Formula (9), and f represents the focal length, and T represents a transposition of a vector or a matrix, [Formula 9]

[Formula 9]

$$K = \begin{bmatrix} f & 0 & 0 \\ 0 & f & 0 \\ 0 & 0 & 1 \end{bmatrix}. \quad (9)$$

12. The camera calibration apparatus according to claim 10, wherein at least one of the focal length, a skew, an optical center, and lens distortion of the camera are used as the internal parameter to be optimized.

13. A camera system comprising:

the camera calibration apparatus according to claim 1; and an image supply apparatus configured to supply, to the camera calibration apparatus, an image obtained by photographing the world coordinate space using the camera.

14. A camera calibration method comprising:

acquiring, by a processor and in an image plane of an image obtained by photographing a world coordinate space using a camera, a first normal vector in the image plane and a second normal vector in the image plane respectively corresponding to a first normal vector in the world coordinate space and a second normal vector in the world coordinate space which are normal vectors with respect to a reference plane in the world coordinate space and have the same length;

calculating, by the processor, a projective depth vector having, as vector elements, four projective depths respectively corresponding to a first start point and a first end point of the first normal vector in the image plane and a second start point and a second end point of the second normal vector in the image plane; and calculating, by the processor, an internal parameter and an external parameter of the camera based on the calculated projective depth vector, a first start point vector in the image plane and a first end point vector in the image plane respectively corresponding to the first start point and the first end point, and a second start point vector in the image plane and a second end point vector in the image plane respectively corresponding to the second start point and the second end point.

15. A non-transitory computer readable medium storing a program executable by a computer to execute processing comprising:

acquiring, in an image plane of an image obtained by photographing a world coordinate space using a camera, a first normal vector in the image plane and a second normal vector in the image plane respectively corresponding to a first normal vector in the world coordinate space and a second normal vector in the world coordinate space which are normal vectors with respect to a reference plane in the world coordinate space and have the same length;

calculating a projective depth vector having, as vector elements, four projective depths respectively corresponding to a first start point and a first end point of the first normal vector in the image plane and a second start point and a second end point of the second normal vector in the image plane; and calculating an internal parameter and an external parameter of the camera based on the calculated projective depth vector, a first start point vector in the image plane and a first end point vector in the image plane respectively corresponding to the first start point and the first end point, and a second start point vector in the image plane and a second end point vector in the image plane respectively corresponding to the second start point and the second end point.

* * * * *